United States Patent [19]
Chen et al.

[11] Patent Number: 5,852,821
[45] Date of Patent: Dec. 22, 1998

[54] HIGH-SPEED DATA BASE QUERY METHOD AND APPARATUS

[75] Inventors: Yong Min Chen, Wellesley; Steven A. Kirk, Chelmsford; Peter W. White, Andover; Clark D. French, Pepperell, all of Mass.

[73] Assignee: Sybase, Inc., Emeryville, Calif.

[21] Appl. No.: 882,678

[22] Filed: Jun. 25, 1997

Related U.S. Application Data

[63] Continuation-in-part of Ser. No. 627,060, Apr. 3, 1996, Pat. No. 5,649,181, which is a continuation of Ser. No. 48,637, Apr. 16, 1993, abandoned, and a continuation of Ser. No. 570,183, Dec. 11, 1995, Pat. No. 5,794,229, and a continuation of Ser. No. 820,864, Mar. 20, 1997.

[51] Int. Cl.$^6$ ..................................................... G06F 17/30
[52] U.S. Cl. ..................................... 707/2; 707/3; 707/10
[58] Field of Search ............................... 707/2, 1–3, 4–6, 707/10

[56] References Cited

U.S. PATENT DOCUMENTS

| | | | |
|---|---|---|---|
| 4,606,002 | 8/1986 | Waisman et al. | 707/3 |
| 4,677,550 | 6/1987 | Ferguson | 364/300 |
| 4,776,026 | 10/1988 | Ueyama | 382/297 |
| 5,153,591 | 10/1992 | Clark | 341/51 |
| 5,293,616 | 3/1994 | Flint | 707/3 |
| 5,377,348 | 12/1994 | Lau et al. | 707/3 |
| 5,404,510 | 4/1995 | Smith et al. | 707/3 |
| 5,495,608 | 2/1996 | Antoshenkov | 707/3 |
| 5,649,181 | 7/1997 | French et al. | 707/3 |
| 5,727,196 | 3/1998 | Strauss Jr., et al. | 707/2 |
| 5,794,228 | 8/1998 | French et al. | 707/2 |
| 5,794,229 | 8/1998 | French et al. | 707/2 |

OTHER PUBLICATIONS

Perrizo et al., "Domain Vector Accelerator (DVA): A Query Accelerator for Relational Operations" IBM Corp., Rochester, MN, IEEE, Data Engineering, 1991 7$^{th}$ Int'l, Dec. 1990, pp. 491–498.

Brodie, M. and Manola, F., "Database Management: A Survey," Computer Corporation of America, May 1987, pp. 1–24.

Hanson–Smith, Ltd., "Advantage Series System Overview, Version 2.0," Computer Corporation of America, 1990, pp. 1–132.

Reinartz, K., "Aspects of vertical mode in multiprocessor systems, unconventional computation on conventional processors," Second International Specialist Seminar on the Design and Application of Parallel Digital Processors, IEEE, 1991, ppp. 48–54.

(List continued on next page.)

*Primary Examiner*—Thomas G. Black
*Assistant Examiner*—Hosain T. Alam
*Attorney, Agent, or Firm*—John A. Smart

[57] ABSTRACT

A server performing an indexing method of data management to create and maintain indexes more efficiently than existing indexing approaches is described. The server is disposed between an application program and a DBMS and is coupled to a data base located within the DBMS. The data base has an ordered set of data values stored in memory. Each data value has a bit pattern and an identifier associated therewith. The server creates a plurality of bit vectors such that the number of bit vectors created equals the longest length bit pattern for the values. The server accesses one of the values stored in the data base. Each bit of the bit pattern for the value is then assigned by the server to a unique position in successive bit vectors. The bits are assigned to identical unique positions in each of the successive bit vectors. The server repeats the above-described accessing and assigning steps for each remaining value of the set to form an index of bit vectors for the values. Methods are provided for improving the performance of database queries when using bit-vector or HighNonGroup (HNG) indexes. Such queries include, for instance, aggregate operations specified in an SQL statement, such as SUM, MAX, MIN, and AVG operations. Specific methods described include optimizing "range" comparisons by reducing bit operations, optimization of MAX and MIN operations, optimization of SUM and AVG operations, implementation of a "Datepart" index, and execution of SUBSTRING predicates in an HNG index.

30 Claims, 3 Drawing Sheets

OTHER PUBLICATIONS

Chu et al., "A Transaction–Based Approach to Vertical Partitioning for Relational Database Systems," IEEE, IEEE Transactions on Software Engineering, v19, n8, Aug. 1993, pp. 804–812.

Naecker, P., "RDBMS Maturity," DEC Professional, v10, n12, Nov. 1991, p. 44(6) [Available: On–Line; DIALOG File 275].

Snellen, D., "Ingres Table Structures, " DBMS, v5, n8, Jul. 1992, p. 60(3) [Available: On–Line; DIALOG File 275].

"Riding High on Expressway 103," Steve Roti, DBMS, v7, n8, p. 90–93.

"Faster Data Warehouses," Herb Edelstein, Information-Week, n 556m p. 77, retrieved from Dialog File 647 (6 pages) at http:/www.dialogweb.com on Sep. 5, 1998.

5,852,821

HIGH-SPEED DATA BASE QUERY METHOD AND APPARATUS

The present application claims the benefit of priority from and is a continuation-in-part application of the following commonly-owned applications: application Ser. No. 08/627,060, filed Apr. 3, 1996 and now U.S. Pat. No. 5,649,181, which is a continuation application of application Ser. No. 08/048,637, filed Apr. 16, 1993 and now abandoned; application Ser. No. 08/570,183, filed Dec. 11, 1995 and now U.S. Pat. No. 5,794,229; and application Ser. No. 08/820,864, filed Mar. 20, 1997 and now pending. The disclosures of the foregoing are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

A data base has been defined as a collection of data that can be concurrently shared and used by multiple applications. Data bases have evolved from simple file systems to massive collections of data serving a community of users and numerous distinct applications.

The data disposed within a data base can be organized as a plurality of records. Each record typically includes data values for one or more common categories of information. For example, each of a plurality of records may include information (i.e., data values) for the following categories: a person's name, address, age, gender, telephone number, account numbers and credit limits.

One important data base tool is the data base management system (DBMS). A DBMS is a data processor which aids in the storage, manipulation, reporting, management and control of the data base. Since the 1970's, DBMSs have become widely used and are becoming the main technology for general purpose data base management.

One purpose of a DBMS is to answer decision support queries and support transactions. A query may be defined as a logical expression over the data and the data relationships set forth in the data base, and results in identification of a subset of the data base. For example, a typical query for the above-noted data base might be a request for data values corresponding to all customers having account balances above required limits. A transaction includes several query and altering operations over data and is used to define application events or operations.

A DBMS typically utilizes one or more indexes to answer queries. Indexes are organized structures, created by a data base administrator, associated with the data to speed up access to particular data values (i.e. answer values). Indexes are usually stored in the data base and are accessible to a data base administrator as well as end users.

One indexing approach is based on a structure known as the B-Tree. A B-Tree index is a multi-level, trie-structured index in which all leaf entries (i.e., data values) in the structure are equidistant from the root of the tree. As a result, the B-Tree index provides uniform and predictable performance for retrieval operations. A B-Tree index includes a root page, zero or more intermediate pages and a set of leaf pages. The leaf level includes an entry for each unique value of the indexed data, providing the indexed value and an indication (typically a row identifier) for each data base record that contains the value. Each level above the leaf level contains an index entry for every page of the level below. Thus, the B-Tree structure provides relatively fast, direct access to the leaf pages and hence, the indexed data.

Another indexing approach, which is a refinement of B-Tree indexing, is known as the keyword indexing. In this approach, a modified B-Tree is formed for the unique values of a group of data values. More specifically, the B-Tree has only the unique values at the leaf level with a bitmap associated with each unique value. For example, consider a block of data having fifty thousand records (i.e., distinct rows of data) which indicate, among other things, gender for each of fifty thousand people. In this situation, there are three unique values: male, female and undefined. Thus, three bitmaps would be generated, one each for male, female and undefined. Each bitmap would have fifty thousand bits, with 1 bits at locations corresponding to those people with that gender and 0 bits at locations corresponding to those people having another gender.

Existing indexing approaches, such as those described above, are not without problems. For example, the B-Tree indexing approach typically requires a substantial period of time for creating the indexes. Once created, existing B-Tree indexes occupy a large portion (e.g., 250% of the space allotted for the data) of memory. Additionally, B-Tree indexes are not always fast enough for decision support queries on large-scale DBMSs.

SUMMARY OF THE INVENTION

The present invention, in general, is directed to an index method and apparatus for creating and maintaining indexes in a more efficient manner than existing indexing approaches. Consequently, indexes can be formed in less time and occupy less space in memory with the present approach than with known indexing approaches, particularly for medium cardinality data (i.e. about one hundred to eighty thousand unique data values) and high cardinality data (i.e. about eighty thousand plus unique data values). As such, decision support queries can be processed faster (i.e., up to one hundred times faster) than in existing index approaches. Further, the present index method and apparatus provide seamless technology that enhances the capabilities of existing DBMSs, particularly when employed with large data base systems (i.e., greater than one million records) and used for decision support queries.

More specifically, the present invention features a server for performing an index method of data management. The server is disposed between a processor running an application program and a DBMS and is coupled to a data base located within the DBMS. The data base has an ordered set of data values stored in memory. The set of data values may, for example, correspond to numbered rows of complete records or numbered rows of a subset (i.e., one or more columns) of the records. Each data value has a bit pattern and a unique identifier (e.g., a row identification number) associated therewith.

In accordance with the present indexing method, the server performs the step of creating a plurality of bit vectors. Preferably, the number of bit vectors created equals the length of the longest bit pattern for the values. Preferably, each bit vector initially has the same value (i.e. 0 or 1) in each bit location. The server subsequently performs the step of accessing one of the values stored in the data base. The server then performs the step of assigning each bit of the bit pattern for the value, preferably from the most significant bit to the least significant bit, to a unique position in successive bit vectors. The bits are assigned to identical unique positions in each of the successive bit vectors. For example, for a first value, each bit is assigned to the first bit position for each bit vector. The server repeats the above-described accessing and assigning steps for each remaining value of the set to form an index of bit vectors for the values.

Using the above-described method, a complete set of indexes can be formed that is more compact and efficient than known indexes used by DBMS manufacturers. These highly efficient indexes allow for fast retrieval and/or reconstruction of answer data values in response to queries. Further, using the present method, a user can create indexes customized to the cardinality (i.e. low, medium or high) of the data and/or the types of queries to be performed.

Also described are methods for improving the performance of database queries when using bit-vector or High-NonGroup (HNG) indexes. Such queries include, for instance, aggregate operations specified in an SQL statement, such as SUM, MAX, MIN, and AVG operations. HighNonGroup (HNG) indexes, which comprise vertical slices (i.e., bit vectors or bitmaps) taken from the bit streams of the data values being indexed, are good for a wide range of queries, including aggregations, since query results can be obtained by reducing queries into a sequence of logical AND, OR, and XOR operations performed on these bit vectors or bitmaps. Thus, a good measure of the performance of any operation can be thought of as the number of bit or logical operations the system has to perform: the fewer bit operations required, the better the system's performance. To improve performance, therefore, the methodology of the present invention focuses on reducing the number of bit operations required for processing a given query. Specific methods described include optimizing "range" comparisons by reducing bit operations, optimization of MAX and MIN operations, optimization of SUM and AVG operations, implementation of a "Datepart" index, and execution of SUBSTRING predicates in an HNG index.

BRIEF DESCRIPTION OF THE DRAWINGS

The foregoing summary of the invention, and the various features thereof, as well as the invention itself may be more fully understood from the following detailed description when read together with the accompanying drawings.

DETAILED DESCRIPTION OF A PREFERRED EMBODIMENT

The present invention features an indexing method and apparatus for creating and maintaining indexes for data in a more efficient manner than existing indexing approaches. Indexes can be formed in less time and occupy less space in memory with the present approach than with known indexing approaches, particularly for medium and high cardinality data. As such, decision support queries can be processed up to one hundred times faster than in existing index approaches.

Figure 1:
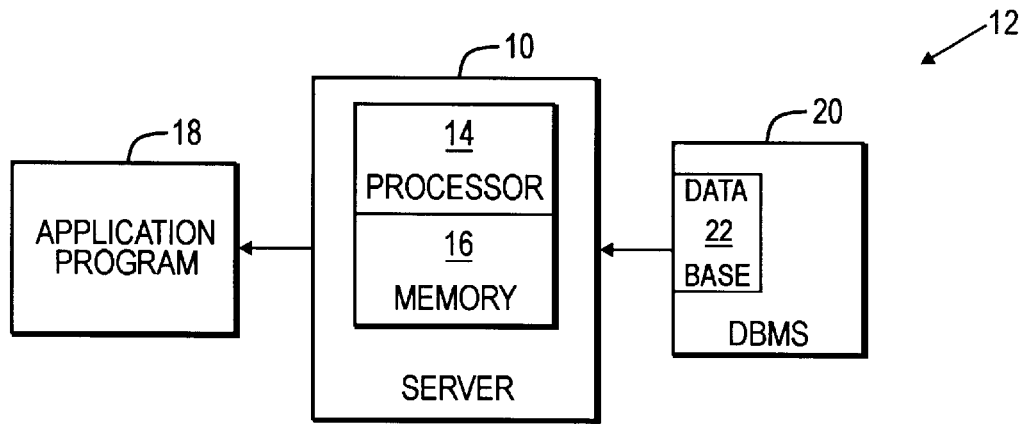
FIG. 1 is a block diagram of a data processing system incorporating the indexing approach of the present invention.

Referring to FIG. 1, the present invention features a server 10 for creating an index for data management within the data processing system 12. The server 10, which may be simply a set of software instructions stored on a disk or in memory, comprises a processor 14 and a memory 16 for storing each index created by the processor. Preferably, the server 10 is disposed between a processor 10 running an application program 18 and a data base management system (DBMS) 20. The processor 18 includes the hardware and software necessary to provide a user interface to the DBMS 20. The DBMS, which may be any backend data base (e.g., Sybase or Oracle), includes a data base 22 to which the server 10 is coupled.

Figure 2:
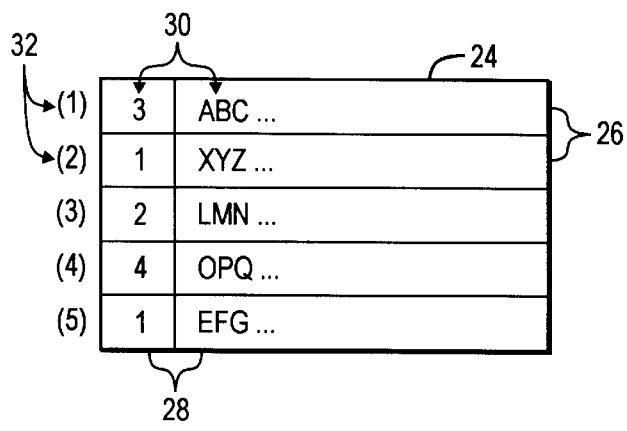
FIG. 2 is a flow chart illustrating process steps for forming an index in accordance with the present method.

Referring to FIG. 2, the data base 22 can include an ordered set of data values stored in the memory 24. The set of data values may correspond to numbered rows 26 of complete records or of one or more columns 28 of the records. Each data value 30 has a bit pattern and a unique identifier 32 (i.e., a row identification number) associated therewith. In this example, all of the data values 30 in a given column 28 have bit patterns of the same length. In general, the data values need not have the same length.

Figure 3:
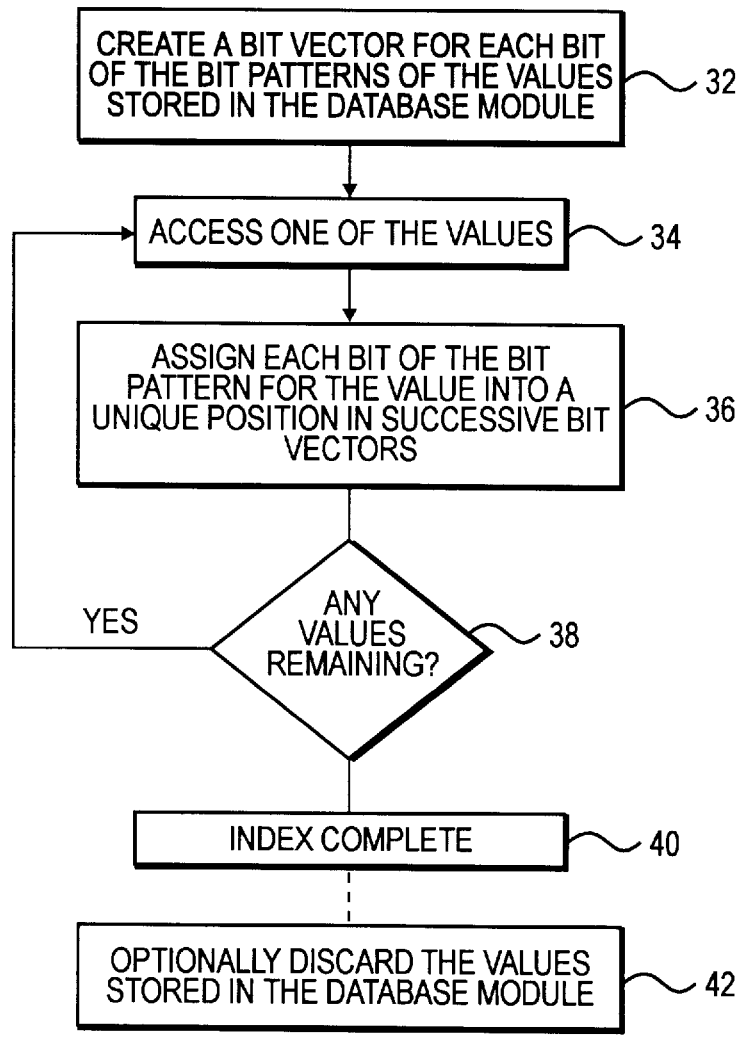
FIG. 3 is an illustration of a sample data base including multiple columns of data values.
Figure 4:
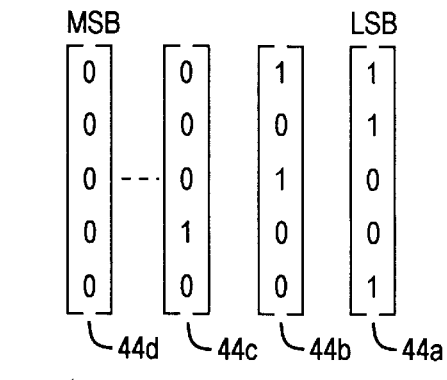
FIG. 4 is a sample index of bit vectors created in accordance with the present method.

Referring to FIG. 3, the server 10 performs the processing steps for creating an index of bit vectors (see FIG. 4). As shown, the processing steps include: creating a plurality of bit vectors such that the number of bit vectors created equals the length of the longest bit pattern for the values (step 32); accessing one of the values stored in the data base (step 34); assigning each bit of the bit pattern for that value, from the most significant bit to the least significant bit, to a unique position in successive bit vectors (step 36); repeating the above-described accessing and assigning steps for each remaining value of the set to form an index of bit vectors for the values (steps 38, 40); and optionally discarding the ordered set of values stored in the data base (steps 42).

Referring to FIG. 4, the present method can be employed to create an index for the left-hand column of data values (i.e., the numbers) shown in FIG. 2. Accordingly, the server 10 first creates a plurality of bit vectors 44a–44d. The number of bit vectors created equals the length of the bit patterns for the values (i.e. the numbers). For example, if the memory allocates 32 bits per character (or digit) for each value, then 32 bit vectors are created. Preferably, each bit vector initially has all 0s in each bit location.

The server then performs the steps of accessing the first value (i.e. the number 3) stored in the memory 24. Each value in the memory 24 is represented, in this example, by a 32-bit bit pattern. Thus, the number 3 has a bit pattern 0 . . . 011. Next, each bit of the bit pattern from the most significant bit to the least significant bit is assigned by the server to the first position in each of the bit vectors 44a–44d. In other words, the most significant bit for the number 3 is assigned to the first position of the first vector 44d and the least significant bit is assigned to the first position of the last bit vector 44a.

The server determines whether any unaccessed values remain in the memory 24. Since four numbers remain, the above-described accessing and assigning steps are repeated for each remaining number to form an index 46 of bit vectors for the numbers. The server may also perform a data compression step for reducing the data stored in the data base. To that end, the server may discard or erase the column of numbers or the entire contents of the memory 24 subsequent to the formation of a complete set of indexes.

Using the present method, the server can form a complete set of indexes that are more compact and efficient than known indexes used by DBMS manufacturers, programmers and users. These highly efficient indexes enable the server to quickly retrieve and/or reconstruct answer data values in response to queries.

Figure 5:
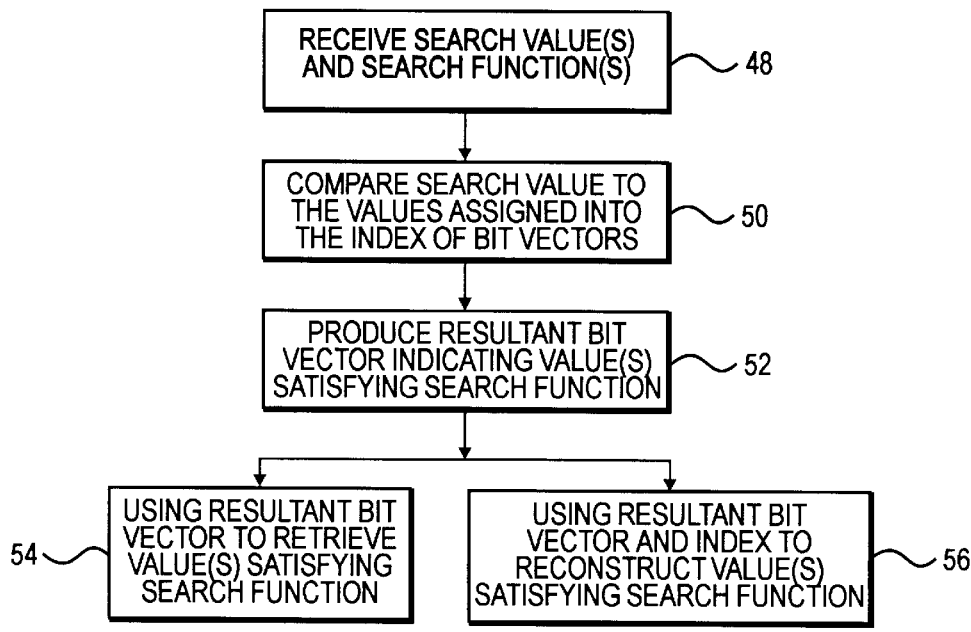
FIG. 5 is a flow chart illustrating process steps for retrieving or reconstructing data values in response to a query using the present method.

To that end, the present method can also include additional processing steps enabling fast response/retrieval to one or more decision support queries. Referring to FIG. 5, the server may be equipped to perform the following processing steps: receiving from the application program a query, including a search value and a search function (e.g., <, >, =, etc.), from the application program (step 48); performing, in response to the query, a comparison of the search value to each bit vector in the designated index (step 50); and producing a resultant bit vector having a bit pattern which indicates the unique identifier of each value satisfying the search function (step 52). The server can utilize the resultant bit vector to perform the step of retrieving from the data base each data value satisfying the search function (step 54). Alternatively, the server can perform the step of reconstructing from the index each data value satisfying the search function (step 56). Using either approach, the server can then provide the retrieved or reconstructed values to the application program.

Figure 6:
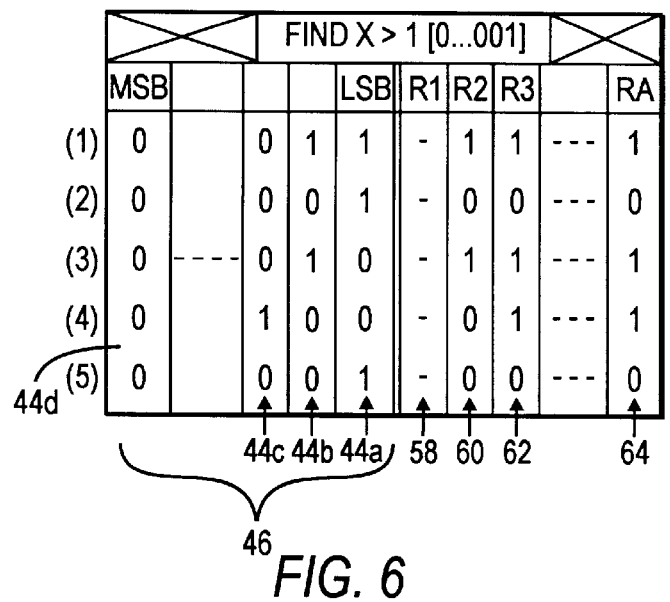
FIG. 6 is a chart illustrating the results of a sample query performed using the present method.
Figure 7:
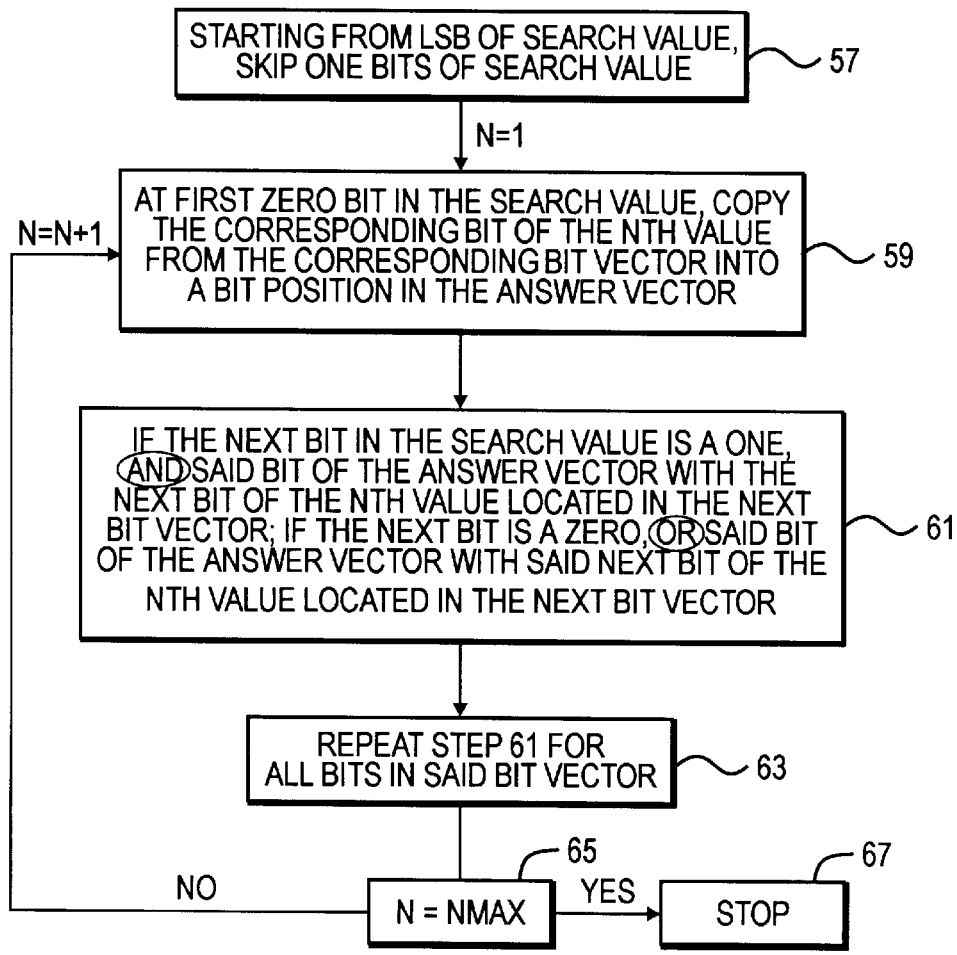
FIG. 7 is a flow chart illustrating process steps for comparing a search value to data values assigned into an index.

With reference to FIGS. 6–7, the method steps of FIG. 5 can be employed in the server to search the index 46 for retrieving and/or reconstructing those data values greater than a search value (i.e., the number 1) as shown in FIG. 6. As shown, the 32-bit bit pattern for the number 1 is 0 . . . 001. The server receives a query from, for example, the application program. The query may be a request for those data values in the index 46 which are greater than the number 1. Responsive to the query, the server compares the number 1 to each of the values assigned into the index. This comparison step is performed by manipulating the bit vectors 44a–44d, including performing Boolean functions on selected bit vectors, based on the search value and the search function.

In this example, the comparison step is performed in accordance with the flow chart shown in FIG. 7. With reference to FIGS. 6 and 7, beginning with the first value (i.e., N=1) and starting from the least significant bit of the search value, 1 bits are skipped (step 57). Thus, the least significant bit of the search value is skipped such that the first position of the answer vector 58 is blank. Next, beginning with the least significant 0 bit in the search value, the corresponding bit of the first value, located in the corresponding bit vector, is copied into the first position of the second answer vector 60 (step 59). Since the second bit for the number 1 is a 0, the second bit (i.e., 1) of the first value (i.e., 3) of the vector 44b is copied into the first position of the answer vector 60. If the next bit in the search value is a 1, the next bit of the first value, which is located in the first position of the next bit vector, is ANDed with the bit located in the first position of the answer vector 60; alternatively, if the next bit in the search value is a 0, the next bit of the first value is ORed with the bit in the first position of the answer vector 60 (step 61). In this example, the next bit (i.e., the third bit) of the first value is a 0, so that 0 bit is ANDed with 1 bit in the first position of vector 60 and the result is listed in the first position of the answer vector 62. The AND/OR step is subsequently repeated for the first value until all 32 bits have been compared to the bits of the search value (step 63). Next, it is determined whether the vectors include any additional data values (step 63). If they do, the comparison steps (steps 59–63) are repeated for next data value. Once the comparison is performed on all data values, the process is stopped.

After the comparison is complete, the server produces a resultant bit vector 64 having a bit pattern which indicates (via 1s in appropriate bit positions corresponding to the row identifiers) the numbers satisfying the search function. As shown, the first, third, and fourth numbers in the memory satisfy the search function (i.e., numbers greater than 1).

The server can utilize the resultant bit vector 64 to retrieve from the memory 24 (FIG. 2) each number satisfying the search. To that end, the server would retrieve the numbers stored in those rows of the first column of the memory indicated in the bit pattern of the resultant vector 64. Alternatively, the server may reconstruct from the index those numbers satisfying the search. The server selects the first bit of each bit vector to reconstruct the number corresponding to that which is stored in the first row of the memory 24 (FIG. 2). Similarly, the server selects the third and fourth bits of each bit vector to reconstruct the numbers corresponding to those stored in the third and fourth rows of memory. With this approach, the server does not have to access the memory 24 to respond to a query. Using either approach, the server can then provide the retrieved or reconstructed values to the application program.

The speed of searching indexed data can depend on, for example, the cardinality of the data, the complexity of the search query, etc. Accordingly, the present method allows a user to select the type of index to be formed. As such, a user can form a B-Tree index or a bit vector index depending upon such factors as the cardinality of the data, the data base size and the query.

Improved Query Processing Methodologies

A. Introduction

Users working with database products often find the need to index columns in tables in a database to achieve faster speeds for query resolution. As such indexes often take more space than the original data, users are reluctant to index more than a few of the data columns to avoid a space explosion. Further, many database products are unable to combine the indexes at query execution time of more than a few columns, or multiple indexes of differing types on the same column, in a time saving manner, thus effectively preventing users from indexing more than a few columns. At a general level, the design of the database system of the present invention addresses these problems (index size and index combinatorics) and specifically speeds up DSS (Decision Support System) or OLAP (On-line Analytical Processing) type queries.

Before describing the improved query processing methodologies in detail, it is first helpful to summarize the different index types employed in the system of the present invention for different usage situations. These includes: FastProjection (FP), LowFast (LF), HighNonGroup (HNG), LowDisk (LD), and HighGroup (HG). Each will be described in turn.

FastProjection methodology entails vertical partitioning of the data into a single column stored as an array of data, where each cell in the array is as wide as the data column and the number of cells in the array matches the number of rows in the table. This index is used to provide fast access to the original data value given a row number. Further description of the methodology is presented in commonly-owned U.S. patent application Ser. No. 08/570,183, filed Dec. 11, 1995, now U.S. Pat. No. 5,794,229 the disclosure of which is hereby incorporated by reference.

In LowFast methodology, an index is employed which comprises a B-Tree together with a set of bitmaps. The B-Tree has one node for each unique value in the column and each node has a bitmap associated with it. The associated bitmap has the nth bit on if the nth row of the table contains the value in the B-Tree. This index is used to provide fast access to a set of row numbers given a value among a small set of distinct values (under 1000). Without further optimization or compression, the technique requires a fair amount of disk space to do this.

In HighNonGroup methodology, an index which comprises a set of bitmaps is employed. The number of bitmaps in the set (i.e., 8×width-in-bytes) depends on the maximum width of the data in the column. The value for each row in the table is broken into its component bits. The nth bitmap has the mth bit on if the nth bit of the value (taken left to right) at the mth row of the table is on. This index is used to provide fast access to a set of row numbers given a range of values among a large set of distinct values (over 1000), when query grouping operations are not needed. It uses a moderately small amount of disk space to do this. Further description of the methodology is presented in commonly-owned U.S. patent application Ser. No. 08/627,060, filed Apr. 3, 1996, now U.S. Pat. No. 5,649,181 which is a continuation of U.S. patent application Ser. No. 08/048,637, filed Apr. 16, 1993 and now abandoned, the disclosures of which are hereby incorporated by reference.

In the LowDisk methodology, an index which comprises a B-Tree and an HNG index is employed. The B-Tree has one node for each unique value in the column and each node has a small unique integer assigned to it. The small unique integer assigned to the value for each row in the table is broken into its component bits. The nth bitmap has the mth bit on if the nth bit of the small unique integer (taken left to right) assigned to the value at the mth row of the table is on. This index is used to provide moderately fast access to a set of row numbers given a value among a small set of distinct values (e.g., under 1000). It uses a very small amount of disk space to do this but is typically not as fast as the LowFast index.

With HighGroup methodology, an index is employed comprising a B-Tree, an HNG index, and a variation on the FP index. The B-Tree has one node for each unique value in the column and each node has a location in the modified FP index. The embedded HNG index is a normal HNG index and is used to satisfy wide range queries and aggregation functions (i.e., SUM). The B-Tree and modified FP are used to provide fast access to a set of row numbers given a value among a large set of distinct values (over 1000). They are also used to provide efficient handling of grouping queries. The technique uses a relatively large amount of disk space to do this.

Of particular interest to the present invention is improving the performance of database queries when using HNG indexes. Such queries include, for instance, aggregate operations specified in an SQL statement, such as SUM, MAX, MIN, and AVG operations. Specific methods of the present invention for improving system performance during these operations will now be described.

B. Query's Sensitivity to the Number of Required Bitmap Logical Operations

As previously described, HighNonGroup (HNG) indexes comprise vertical slices (i.e., bit vectors or bitmaps) taken from the bit streams of the data values being indexed. HNG indexes are good for a wide range of queries, including aggregations, since query results can be obtained by reducing queries into a sequence of logical AND, OR, and XOR operations performed on these bit vectors or bitmaps. Thus, a good measure of the performance of any operation can be thought of as the number of bitmap logical operations the system has to perform: the fewer bitmap operations required, the better the system's performance. To improve performance, therefore, the methodology of the present invention focuses on reducing the number of bitmap operations required for processing a given query. The advantage of this approach become even more pronounced as the number of rows in an index space grows.

C. Methods for Reducing the Number of Required Bitmap Logical Operations

1. Optimizing "range" comparisons by reducing bit operations a. General methodology One approach to performing a "between" comparison comprising a greater-than-or-equal-to comparison operation (i.e., >=) in an HNG index is to simply OR together (i.e., OR logical operation) a greater-than (>) temporary result set with an equal-to (=) temporary result set. A similar approach can be applied for a less-than-or-equal-to comparison operation (i.e., <=) in an HNG index. Even though these bitmap operations are fairly fast, the system must scan through the given HNG index twice—once for the greater-than case and once for equal-to case—before these results can be ORed together to form a final result set. Further, the approach worsens as the number of data rows increases, since the system will not be able to hold all records in memory. Twice the number of input/output (I/O) operations are required for the same data. Therefore, a better approach is desired.

In accordance with the present invention, the system optimizes the process by reducing the number of logical operations for a given comparison. For instance, a greater-than-or-equal-to comparison (i.e., two logical operations) is converted into a greater-than comparison (i.e., single logical operation). To achieve this result, the system must dynamically adjust the key value which is to be compared against the stream of field values. For a greater-than-or-equal-to comparison, for instance, the system first checks if the value to be compared is already the smallest value possible. If it is, the system returns a result set or bit map with all bits set (i.e., all field values satisfy the condition). If not, the system decrements the key value to be compared. A comparison of >=10 now becomes a comparison of >9, for example. In a corresponding manner, the case of a less-than-or-equal-to comparison (i.e., <=) is optimized by the system first incrementing each value to be compared, thus eliminating the need to perform the equal-to comparison. In this fashion, these bit vectors only need to be processed once, cutting the number of bitmap logical operations in half and also saving one bitmap logical OR operation; as a result, performance of the operations is doubled. The result bit maps themselves can be combined with other result bit maps (e.g., ORed or ANDed), as desired.

In an exemplary embodiment, the optimization may be implemented as follows (shown in the C Programming Language for the greater-than or equal-to case).

```
// key and klen represent the key to be compared with
// fset is used to store the results of the Find
hos_boolean hs_hc::FindGE(const void *key,hos_int klen,s_bm *fset,
                          s_bm *nullset,hos_boolop bop,hos_int limit)
{
    // ...
    hos_boolean all = HOS_FALSE;
    switch (datatype) {
        // ...
        case hos_dtint:
            {
                hos_int number = *(hos_int*)key;
                if (number == HOS_MININT)
                    all = HOS_TRUE;      // all data in the index satisfies the condition
                else {
                    number--;            // decrement by 1 and call FindGT
                    return FindGT(&number, klen, fset, nullset, bop, limit);
                }
            }
            break;
        case hos_dtsbyte:
            {
                hos_sbyte number = *(hos_sbyte*)key;
                if (number == HOS_MINBYTE)
                    all = HOS_TRUE;      // all data in the index satisfies the condition
                else {
                    number--;            // decrement by 1 and call FindGT
                    return FindGT(&number, klen, fset, nullset, bop, limit);
                }
            }
            break;
        // ...
        default:
            hs_hc_Throw(SHC_BADDATATYPE);
    }
    if (all)
        *fset = *GetExistence();
    return fset—>AnyBitsOn();
}                      // hs_hc::FindGE
```

Since the approach is to treat the data just as bit patterns, it can be applied to many different data types. Although there is no benefit for typical row-oriented comparisons, the approach achieves increased performance for vertical bit-sliced bitmap operations, such as those encountered with HNG indexes. For simplicity of design, the approach is applied to simple scalar types, such as integer data. If desired, the approach can be adapted for complex data types. In such a case, however, the system would need to accommodate the applied sort order to that which is appropriate for the data type being compared. For a character data type, for instance, a locale-specific collation table can be employed for providing appropriate sort treatment for different character data (e.g., comparing "ABC" with "ABC").

b. Execution time selection of optimal index for range evaluation

When an HNG index (either explicit, or from inside an HG index) is present on a column that also has a B-Tree index (either an LF index or from inside an HG index), a range predicate that selects a small number of distinct values can be executed with fewer bitmap operations in the B-Tree than by doing it in the HNG index. Specifically, if the number of distinct values within the range is less than the maximum number of bits in the column data, then the range evaluation can be done more efficiently using the B-Tree. If the number of bits in the column data is less than the number of distinct values in the range, then fewer bitmap operations are required to evaluate the range predicate in the HNG index.

In general, the selection of an index to use for a specific predicate can be delayed until the predicate must be evaluated for a specific value. This allows the optimal index to be chosen for each predicate evaluation in cases where a predicate is being evaluated multiple times with the value or values in the predicate changing with each execution (i.e., inside a correlated subquery).

c. Further optimization to "between" comparisons

Further optimization to "between" comparisons can be performed. When the system performs an HNG-based query operation with a range, the system performs the less-than part and ANDs the results with the greater-than part. When the two values are examined together, however, some bitmap operations can be skipped. As an example, suppose one wants to find all rows that are between the values of 2 and 51. When the system performs the greater-than or equal-to 2 comparison (i.e., now, greater than 1 per the previously-described optimization), the system need only examine bits up to the largest bit in the larger number plus 1; for this example, the largest bit is bit 7 (i.e., up to value 64). Specifically, values that are bigger are eventually screened out by the less-than part operations. Hence, the system can skip these bitmap operations thus reducing the number of bitmap operations required and improving performance.

In an exemplary embodiment, the optimization may be implemented as follows (shown in the C Programming Language).

```
//* Method: hs_hc::FindBetween
//* Note: An optimization is applied to unsigned numbers (including date, time,
//*                and datetime), and two positive numbers. This optimization is to
//*                check the bits when doing >, >= up to 1 bit beyond the highest 1 bit
//*                in the bigger value. Since any value bigger than that will be
//*                eliminated by the <, <= after the AND of the two results.
//* Note also that key2 has to be larger than key1
//*
void hs_hc::FindBetween(const void *key1,hos_int klen1,hos_op op1,
                        const void *key2,hos_int klen2,hos_op op2,s_bm *fset)
{
    hos_int limit = _Nbits;
    switch (GetDataType()) {
        case hos_dtsbyte:
        case hos_dtshort:
        case hos_dtint:
            if (KeyIsPositive(key1, klen1) && KeyIsPositive(key2, klen2)) {
                limit = FindHighest1Bit(key2, klen2) + 1;
            }
            break;
        case hos_dtubyte:
        case hos_dtushort:
        case hos_dtuint:
            limit = FindHighest1Bit(key2, klen2) + 1;
            break;
        // . . .
        default:
            ;// do nothing
    }
    if (limit > _Nbits)             // what if the bigger number is really big
        limit = _Nbits;
    if (op1 == HOS_GT)              // find the > part with a limit
        FindGT(key1,klen1,fset,0,HOS_NEW,limit);
    else if (op1 == HOS_GE)         // find the >= part with a limit
        FindGE(key1,klen1,fset,0,HOS_NEW,limit);
    else
        hs_hc_Throw(SHC_PROGERROR);
    if (op2 == HOS_LT)              // now AND the result with the < part
        FindLT(key2,klen2,fset,0,HOS_AND);
    else if (op2 == HOS_LE)         // now AND the result with the <= part
        FindLE(key2,klen2,fset,0,HOS_AND);
    else
            hs_hc_Throw(SHC_PROGERROR);
}       // hs_hc::FindBetween
```

2. Optimization of MAX and MIN operations

Since the optimizations for both MAX/MIN are similar, the following will focus on one, MAX. When performing a MAX aggregate operation, the system must examine the highest order bit (i.e., sign bit) for each data value to determine whether the value is signed. If the data values encountered are not all negative, the system proceeds by first eliminating all negative numbers from the result set (i.e., one "turn off"0 bitmap operation). If the data values are all negative, or the data are all unsigned, the system employs a methodology that starts at the highest order bit vector. Here, the system starts from the highest order bit vector (excluding the sign bitmap if the data is signed), and walks toward lower order bitmaps, looking for 1s. For a given bit vector, for instance, only those items having 1s are kept, thus eliminating any items having zero for the bit vector under examination.

Each bit vector is ANDed with a temporary result or "found" set. If there are no more bits set in the "found" set, the previous "found" set will be retained. If there is any bit set in the "found" set, this becomes the current "found" set. In this manner, the system can continue processing bit vectors until it reaches the lowest order bit vectors. Any bit on in the final "found" set represents the maximum value.

Further optimization can be achieved by examining these intermediate "found" sets. If any of these "found" sets have only one bit set, the system can stop right there—the (only) record with the maximum value has been found.

In an exemplary embodiment, the optimization may be implemented as follows.

```
hos_boolean hs_hc::Max(const s_bm *fset, void* value, hos_int *klen) {
    // . . .
    hos_int i=0;
    s_bm **bm=_BitMaps;
    hos_boolean NeedFirst=HOS_TRUE;
    switch (GetDataType()) {
        // . . .
        case hos_dtuint:
        case hos_dtushort:
```

```
            case hos_dtubyte:
                    break;
            case hos_dtint:
            case hos_dtshort:
            case hos_dtsbyte:
                {
                    // Find Any Pos Numbers
                    tmp = foundSet;
                    tmp.TurnOff(**bm);
                    // If Any Positive numbers Max must be positive. Get rid of negs.
                    if (tmp.AnyBitsOn()) {
                        foundSet = tmp;
                    }
                    // Skip over sign bit.
                    bm++;
                    i++;
                }
            default:
                    hs_hc_Throw(SHC_BADDATATYPE);
            }
            for (;i < _Nbits;i++,bm++) {
                if ((*bm)—>Count()) {
                    tmp.And(**bm,foundSet);
                    if (NeedFirst) {
                        // if we haven't found the first "found" set with at least 1 bit
set
                        if (tmp.AnyBitsOn()) {
                            // now we found our first "found" set with at least 1 bit set
                            NeedFirst=HOS_FALSE;
                            foundSet = tmp;
                        }
                    }else{
                        tmp &= foundSet;    // we want to keep the 1's
                        if (tmp.AnyBitsOn()) {
                            // there are at least 1 bit set in the "found" set
                            foundSet = tmp;
                        }
                        if (foundSet.Count() == 1)
                            break;           // we've found our max
                    }
                }
            }
            hos_uint recid=foundSet.FindBit();
            if (recid)
                GetKeyValue(value,*klen,recid);
            return recid;
}                           // hs_hc::Max
```

As the foregoing illustrates, for a given bit vector, only those items having 1s are kept, thus eliminating any items having zero for the bit vector under examination. By walking the bit vectors successively in this manner, the system can efficiently determine the maximum (MAX) value (or minimum value) present in the dataset.

As previously mentioned, the optimizations for both MAX/MIN are similar. The difference between MIN and MAX is that instead of keeping 1's, 0 is kept. Otherwise, the optimizations are basically the same.

3. Large precision accumulator a. General methodology

An HNG index can be employed to provide fast SUM/AVG operations. Here, the system takes the number of 1 bits in each bit vector and multiplies that by the corresponding power of 2 for the bit vector. For the lowest order bit vector, the count would be multiplied by 1 (i.e., 2 raised to the power of 0), the next one multiplied by 2 (2 to the power of 1), and so forth and so on. A problem arises, however, as to how to handle negative numbers—specifically, how the system improves performance by not doing multiplication and not calculating the power of 2.

A solution to this problem is to use a large precision accumulator. The largest ranges are calculated first (for example, summing integers (32 bits)). Since the sum cannot be larger than 64 bits (at most there are 4 billion−2 to the power of 32 rows), the accumulator is set to 64 bits. Now, the system determines a count of the highest order bits, adds that count to the accumulator, and then shifts the result left by 1 (i.e., effectively multiply by 2). Then, the system adds in the next bit vector count and shifts it to the left again. This continues until all bit vector counts have been added up.

The system adjusts for negative numbers as follows. For bit position 33 to 64, the system adds in the number of negative numbers (i.e., basically sign-extending those numbers to 64 bits), ignoring any bits which overflow beyond the bit 64. This yields a signed 64-bit result. The approach can be extended to bigger data types, such as 64-bit integers and other 2's complement numeric data. It can also be employed when the representation of the allowed number of rows is extended to 2 to the 64th. By using shift and add operations (instead of multiplication and power, which are expensive), the optimization improves system performance. Further, scanning the HNG index twice for signed data (i.e., once for positive and once for negative numbers) is avoided.

In an exemplary embodiment, the optimization may be implemented as follows.

```
                hos_int i;
                hos_recid counter;
                // Find Neg values.
                tmpbm.And(*fset,**_BitMaps);
                hos_recid negCount=tmpbm.Count();
                // If no neg values. Can do as unsigned.
                HOS_GPR2 s_bm **bm=_BitMaps;
                sum—>Add(negCount);        // deal with sign bit vector
                bm++;
                for(i=1;i < _Nbits;i++,bm++) {
                    sum—>ShiftLeft();      // effectively multiply it by 2 . . .
                    tmpbm.And(**bm,*fset);
                    counter=tmpbm.Count();
                    sum—>Add(counter);     // add in the next bit vector count
                }
                if (negCount)              // we have negative values
                    sum—>AdjustForNegatives(_Nbits, negCount);
void hos_sumAgg::AdjustForNegatives(const hos_uint bitStart,
                        const hos_recid howmany)
{
    // adjust the size first
    _size = (bitStart >> 6) + (sizeof(hos_recid) >> 2) + 1;
    hos_recid carryover=0;
    if (bitStart < HOS_BITSPERINT) {
        // this is for 1-byte (char) and 2 byte (short) cases
        hos_uint mask = 1U << bitStart;
        for (hos_uint i=bitStart; i<HOS_BITSPERINT; i++, mask <<= 1) {
            // we are sign extending the negative numbers
            carryover += howmany;
            if (_Num[0] & mask)
                carryover++;
            if (carryover & 0x1)
                _Num[0] |= mask;
            else
                _Num[0] &= ~mask;
            carryover >>= 1;
        }
    }
    for (hos_uint j=((bitStart - 1) >> 5) + 1; j<_size; j++) {
        hos_uint mask = 1U;
        for (hos_uint i=0; i<HOS_BITSPERINT; i++, mask <<= 1) {
            // we are sign extending the negative numbers
            carryover += howmany;
            if (_Num[j] & mask)
                carryover++;
            if (carryover & 0x1)
                _Num[j] |= mask;
            else
                _Num[j] &= ~mask;
            carryover >>= 1;
        }
    }
}                    // hos_sumAgg::AdjustForNegatives
```

This process demonstrates that the system can quickly determine a SUM value for a given column from the statistics it maintains for each bit vector. More particularly, there is no need to reconstitute individual field values, nor is there a need to scan the underlying table or scan the index. The SUM operation can easily be adapted for determining an AVG (average) value. After calculating the SUM value as described above, the calculated value is then simply divided by the number of records. The result yields the AVG value for the column.

b. Handling overflow

To handle overflow, the system simply employs a data unit much larger than that which is needed to store field values. Consider 32-bit integer values, for example. Here, numbers are stored in 2's complement fashion, with the 32nd bit position storing the sign bit. Since each bit vector maintains a total of how many bit values are equal to 1, the system already knows at the outset how many negative numbers are present (i.e., from the number of bit values set equal to 1 for the 32nd bit vector). To appropriately handle overflow (or underflow) of the values, the add/shift operation is carried out using data units larger than 32 bits, such as 64-bit, 128-bit, or even 2048-bit signed integers. The sign bits are preserved by sign-extending the values. Since the numbers are stored in 2's complement fashion, the system at this point can proceed with the add/shift approach.

4. Datepart HNG index

Conventionally, database systems represent date-based data as an unsigned integer storing the number of days since a fixed point in time, such as Jan. 1, year 0. For a system providing HNG indexes, however, this is a suboptimal representation, especially when one needs to perform "datepart" functions (e.g., extracting the year, month, or day) on date-based data. Therefore, a better approach is needed.

In accordance with the present invention, each datepart—that is, year, month, and day—is encoded as a separate entity within an HNG index, thereby forming a "datepart" HNG index. In an exemplary embodiment, for instance, the system employs five bit vectors for representing day values, four bit vectors for representing month values, and fourteen bit vectors for representing year values. Instead of employing 32 bit vectors (for an unsigned integer), the approach only uses 23 bit vectors for representing date values.

Queries requiring datepart calculations can be performed much faster. For example, a query requiring the determination of a month datepart can be performed just from the month part of the index, instead of the slow process of reconstituting each date value and computing its month part. Moreover, other date queries can often be converted into datepart ones, for quick execution. For instance, a query for records between "Jan. 1, 1990" and Jan. 31, 1990" can be converted into a simple month/year query for "January 1990", thus requiring the system to examine only bit vectors 6 through 23. A query for "Jan. 1, 1990" to "Dec. 31, 1990", on the other hand, can be simplified into a year query for "1990". Furthermore, a query for between "Jan. 1, 1997" and "Nov. 30, 1997" can be changed to one for (year=1997 and not (month=December)).

The approach can be extended to include additional bit vectors for encoding other date or time data, including values which might be computationally expensive to recompute. For example, day-of-week values can be computed once and then represented by three bit vectors. Similarly, quarter values can also be computed once and then stored using two bit vectors. Here, an exemplary set of date bit vectors may comprise: day-of-week (three bit vectors), quarter (two bit vectors), year (fourteen bit vectors), month (four bit vectors), and day (five bit vectors). At the same time, however, date comparisons continue to work (using the first 23 bit vectors).

In an exemplary embodiment, the optimization may be implemented as follows.

```
switch (request_type) {
    case HNG_COMPARE_DATE:
        start_pos = 0;
        length = 23;
        break;
    case HNG_DAY_OF_MONTH:
        start_pos = 0;
        length = 5;
        break;
    case HNG_MONTH_OF_YEAR:
        start_pos = 5;
        length = 4;
        break;
    case HNG_YEAR:
        start_pos = 9;
        length = 14;
        break;
    case HNG_DAY_OF_WEEK:
        start_pos = 23;
        length = 3;
        break;
    case HNG_QUARTER:
        start_pos = 26;
        length = 28;
        break;
    default:
        hs_hc_Throw(SHC_BADDATATYPE);
}
```

5. Executing SUBSTRING predicates in an HNG index

When presented with a predicate that directly includes a SUBSTRING function applied to a column being compared to a value (e.g. SUBSTRING(column_1, 1, 3)="PT"), conventional databases read the entire column (and perhaps the entire row), and then apply the SUBSTRING operation on the column before the predicate can be executed. With an explicit or implicit HNG index, predicates such as that described above can be executed much more quickly by comparing only the bit vectors that correspond to the specific set of character positions selected by the SUBSTRING. In the case above, only the first 16 bit vectors must be compared, and the other bit vectors in the HNG do not even need to be read.

This approach can also be applied to improve the performance of some of the possible uses of a LIKE predicate. For example, column_1 LIKE "PT %"

can be rewritten as:

SUBSTRING(column_1, 1, 3) "PT"

Similarly, the predicate:

column_1 LIKE "X.T %"

can be rewritten as:

SUBSTRING(column_1, 1, 1)="X" AND

SUBSTRING(column_1, 3, 1)="T" "

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system for representing information in database tables and for retrieving information from database tables in response to database queries, each database table comprising data records storing information categorized into one or more database fields, each database field storing information in a particular data type, a method for optimizing database range queries, the method comprising:

(a) receiving a database range query having a query condition which specifies selection of data records satisfying a particular range;

(b) if the query condition specifies selection of values of a particular database field of the data records which are less than or equal to a maximum key value, performing substeps of:

(i) if the maximum key value represents the maximum value possible for the particular data type of the particular database field, creating a result set indicating that all data records have values for the particular database field which satisfy the query condition, otherwise (ii) incrementing the maximum key value by one and creating a result set indicating those data records having values for the particular database field which are less than the incremented maximum key value; and (c) if the query condition specifies selection of values of a particular database field of the data records which are greater than or equal to a minimum key value, performing substeps of:

(i) if the minimum key value represents the minimum value possible for the particular data type of the particular database field, creating a result set indicating that all data records have values for the particular database field which satisfy the query condition, otherwise (ii) decrementing the minimum key value by one and creating a result set indicating those data records having values for the particular database field which are greater than the decremented minimum key value.

2. The method of claim 1, wherein said query condition specifies that values of the data field must be less than or equal to a maximum key value and must be greater than or equal to, and wherein said method further comprises:

(d) performing a logical AND operation of the result set obtained in step (b) with the result set obtained in step (c).

3. The method of claim 1, wherein each value of the particular data field is obtained for the query from an existing index on the particular data field.

4. The method of claim 1, wherein each value of the particular data field is obtained for the query by reconstituting the value from an existing bit-vector index on the particular data field.

5. The method of claim 1, wherein the data type of the particular data field is a scalar data type.

6. The method of claim 1, wherein the data type of the particular data field is an integer data type.

7. The method of claim 1, wherein steps (b)(ii) and (c)(ii) are performed using bit-sliced bit map operations.

8. The method of claim 1, wherein each result set comprises a bit map indicating a particular set of data records.

9. The method of claim 1, wherein the database range query comprises a Structured Query Language (SQL) statement.

10. The method of claim 1, wherein each value of the particular data field is obtained for the query from an existing index on the particular data field, and wherein a B-Tree index is selected if fewer distinct values exist than a maximum number of bits for the particular data field.

11. In a database system for representing information in database tables and for retrieving information from database tables in response to database queries, each database table comprising data records storing information categorized into one or more data fields, each data field storing information in a particular data type, a method for optimizing database range queries, the method comprising:

(a) receiving a database range query having a query condition which specifies that values of a particular data field must be less than or equal to a maximum key value and must be greater than or equal to a minimum key value;

(b) creating a first result set by performing substeps of:

(i) if the minimum key value represents the minimum value possible for the particular data type of the particular data field, creating a first result set indicating that all data records have values for the particular data field which are greater than or equal to the minimum key value, otherwise (ii) decrementing the minimum key value by one and creating a first result set indicating those data records having values for the particular data field which are greater than the decremented minimum key value, said first result set being created by only examining those bits of the values of the particular data field up to the largest 1 bit of the maximum key value plus 1;

(c) creating a second result set by performing substeps of:

(i) if the maximum key value represents the maximum value possible for the particular data type of the particular data field, creating a second result set indicating that all data records have values for the particular data field which satisfy the query condition, otherwise (ii) incrementing the maximum key value by one and creating a second result set indicating those data records having values for the particular data field which are less than the incremented maximum key value; and (d) performing a logical AND operation between said first and second result sets for creating a final result set indicating those data records having values of the data field which are less than or equal to the maximum key value and greater than or equal to the minimum key value.

12. The method of claim 11, wherein each value of the particular data field is obtained for the query from an existing index on the particular data field.

13. The method of claim 11, wherein each value of the particular data field is obtained for the query by reconstituting the value from an existing bit-vector index on the particular data field.

14. The method of claim 11, wherein the data type of the particular data field is a scalar data type.

15. The method of claim 11, wherein the data type of the particular data field is an integer data type.

16. The method of claim 11, wherein steps (b)(ii) and (c)(ii) are performed using bit-sliced bit map operations.

17. The method of claim 11, wherein each result set comprises a bit map indicating a particular set of data records.

18. The method of claim 11, wherein the database range query comprises a Structured Query Language (SQL) statement.

19. The method of claim 11, wherein each value of the particular data field is obtained for the query from an existing index on the particular data field, and wherein a B-Tree index is selected if fewer distinct values exist than a maximum number of bits for the particular data field.

20. The method of claim 11, wherein the data type of the particular data field is a 32-bit integer data type and the maximum key value can be stored within 7 bits, and wherein step (b)(ii) is performed by only examining up to a value of 64.

21. In a database system for representing information in database tables and for retrieving information from database tables in response to database queries, each database table comprising data records storing information categorized into one or more data fields, a method for optimizing database MAX queries performed on a particular data field having a bit-vector index, said bit-vector index comprising a plurality of bit vectors each of which comprises a bit slice through a corresponding bit position of the data field, the method comprising:

(a) receiving a query requiring determination of a maximum value for the data field;

(b) initializing a found set for specifying at least one data record having the maximum value;

(c) starting from a highest order bit vector, successively scanning each bit vector by:

(i) creating a temporary found set for the bit vector for specifying those data records having 1s for the corresponding bit position of the data field, thereby eliminating from the temporary found set all data records having 0s for the corresponding bit position of the data field, (ii) if the temporary found set specifies no records, proceeding to step (d), (iii) if the temporary found set specifies at least one record, combining the temporary found set with the previously-initialized found set and repeating step (c) for any remaining bit vectors; and (d) determining the maximum value from at least one record which remains in the found set.

22. The method of claim 21, wherein step (c)(iii) further comprises:

if the temporary found set specifies exactly one record, combining the temporary found set with the previously-initialized found set and thereafter proceeding to step (d).

23. The method of claim 21, wherein said combining step includes performing a logical AND operation between the temporary found set for the bit vector and the previously-initialized found set.

24. The method of claim 21, wherein the data field comprises unsigned values.

25. The method of claim 21, wherein the data field comprises signed values and wherein the method further comprises first scanning a highest order bit vector for eliminating all negative numbers from the found set.

26. In a database system for representing information in database tables and for retrieving information from database tables in response to database queries, each database table comprising data records storing information categorized into one or more data fields, a method for optimizing database MIN queries performed on a particular data field having a bit-vector index, said bit-vector index comprising a plurality of bit vectors each of which comprises a bit slice through a corresponding bit position of the data field, the method comprising:

(a) receiving a query requiring determination of a minimum value for the data field;

(b) initializing a found set for specifying at least one data record having the minimum value;

(c) starting from a highest order bit vector, successively scanning each bit vector by:

(i) creating a temporary found set for the bit vector for specifying those data records having 0s for the corresponding bit position of the data field, thereby eliminating from the temporary found set all data records having 1s for the corresponding bit position of the data field, (ii) if the temporary found set specifies no records, proceeding to step (iii) if the temporary found set specifies at least one record, combining the temporary found set with the previously-initialized found set and repeating step (c) for any remaining bit vectors; and (d) determining the minimum value from at least one record which remains in the found set.

27. The method of claim 26, wherein step (c)(iii) further comprises:

if the temporary found set specifies exactly one record, combining the temporary found set with the previously-initialized found set and thereafter proceeding to step (d).

28. The method of claim 26, wherein said combining step includes performing a logical AND operation between the temporary found set for the bit vector and the previously-initialized found set.

29. The method of claim 26, wherein the data field comprises unsigned values.

30. The method of claim 26, wherein the data field comprises signed values and wherein the method further comprises first scanning a highest order bit vector for eliminating all positive numbers from the found set.

* * * * *